US010253470B2

(12) United States Patent
Higgins

(10) Patent No.: US 10,253,470 B2
(45) Date of Patent: Apr. 9, 2019

(54) FLOATABLE APPARATUS FOR THE COLLECTION, SEPARATION, CONTAINMENT AND REMOVAL OF SOLIDS FROM A WATER BODY

(71) Applicant: P-Pod Technologies, LLC, Amesbury, MA (US)

(72) Inventor: Jonathan B. Higgins, Amesbury, MA (US)

(73) Assignee: P-Pod Technologies, LLC, Amesbury, MA (US)

( * ) Notice: Subject to any disclaimer, the term of this patent is extended or adjusted under 35 U.S.C. 154(b) by 106 days.

(21) Appl. No.: 15/235,546

(22) Filed: Aug. 12, 2016

(65) Prior Publication Data

US 2017/0044028 A1    Feb. 16, 2017

Related U.S. Application Data

(60) Provisional application No. 62/205,475, filed on Aug. 14, 2015.

(51) Int. Cl.
*E02B 15/04* (2006.01)
*E02B 15/08* (2006.01)
(Continued)

(52) U.S. Cl.
CPC ........ *E02B 15/0857* (2013.01); *E02B 15/045* (2013.01); *E02B 15/0807* (2013.01);
(Continued)

(58) Field of Classification Search
CPC .. E02B 15/045; E02B 15/048; E02B 15/0807; E02B 15/0814; E02B 15/0842; E02B 15/10; C02F 2103/007
(Continued)

(56) References Cited

U.S. PATENT DOCUMENTS 2,383,840 A    8/1945    Benckert
3,664,136 A    5/1972    Laval, Jr. et al.
(Continued)

FOREIGN PATENT DOCUMENTS

EP    3133209    *    2/2017
FR    2871177        6/2004
(Continued)

OTHER PUBLICATIONS

Notice of Allowance for U.S. Appl. No. 15/045,794, "Submersible Isolation Enclosure Apparatus", dated Mar. 27, 2017.
(Continued)

*Primary Examiner* — Christopher Upton
(74) *Attorney, Agent, or Firm* — Hamilton, Brook, Smith & Reynolds, P.C.

(57) ABSTRACT

A floatable, portable and readily deployable apparatus used in a surface water body for the collection, mixing, separation, containment and removal of total solids from fluid in surface water by settling, sorption, floatation or filtration of total solids from fluid entering or pumped into the apparatus. Separation of total solids from fluid can include the use and recycling of commercially available or proprietary biologic, chemical and/or physical substances and processes to increase the rate and percentage of total solids removed from fluid in the apparatus.

30 Claims, 4 Drawing Sheets

(51) Int. Cl.
*E02B 15/10* (2006.01)
*C02F 103/00* (2006.01)
*C02F 101/30* (2006.01)

(52) U.S. Cl.
CPC .......... *E02B 15/0814* (2013.01); *E02B 15/10* (2013.01); *C02F 2101/30* (2013.01); *C02F 2103/007* (2013.01); *C02F 2201/008* (2013.01); *C02F 2303/04* (2013.01); *Y02W 10/37* (2015.05)

(58) Field of Classification Search
USPC ... 210/170.05, 170.09, 170.11, 242.1, 242.3, 210/747.6, 776, 923
See application file for complete search history.

(56) References Cited

U.S. PATENT DOCUMENTS

| | | | |
|---|---|---|---|
| 3,688,506 A | | 9/1972 | Marcocchio |
| 3,851,487 A | | 12/1974 | Lambertsen |
| 3,875,062 A | * | 4/1975 | Rafael .................. E02B 15/046 |
| | | | 210/242.3 |
| 3,909,416 A | * | 9/1975 | In't Veld ............... E02B 15/046 |
| | | | 210/776 |
| 4,047,390 A | | 9/1977 | Boyce, II |
| 4,073,143 A | | 2/1978 | Preus |
| 4,373,834 A | | 2/1983 | Grace |
| 4,395,157 A | | 7/1983 | Cunningham |
| 4,421,436 A | | 12/1983 | Burns |
| 4,449,850 A | | 5/1984 | Cessou et al. |
| 4,588,501 A | * | 5/1986 | Jordan ................. E02B 15/048 |
| | | | 210/242.1 |
| 4,645,379 A | | 2/1987 | Grimsley |
| 4,900,432 A | * | 2/1990 | Arnold ................. E04H 4/1263 |
| | | | 210/242.1 |
| 5,409,607 A | * | 4/1995 | Karlberg ............... E02B 15/048 |
| | | | 210/242.3 |
| 5,478,480 A | * | 12/1995 | Winstone ............. E02B 15/046 |
| | | | 210/170.05 |
| 6,457,907 B1 | | 10/2002 | De Bloeme |
| 6,592,299 B1 | | 7/2003 | Becker |
| 6,881,335 B2 | * | 4/2005 | Nilsen ................. E02B 15/0814 |
| | | | 210/242.3 |
| 7,785,035 B2 | * | 8/2010 | Jarvinen ............... E02B 15/048 |
| | | | 210/170.11 |
| 8,523,482 B1 | | 9/2013 | Watson, Sr. |
| 8,534,365 B2 | | 9/2013 | Dighe |
| 8,678,707 B1 | | 3/2014 | Powell |
| 8,911,619 B2 | | 12/2014 | Becker |
| 9,073,105 B2 | | 7/2015 | Higgins |
| 9,725,862 B2 | | 8/2017 | Higgins |
| 2004/0115003 A1 | | 6/2004 | Johnston |
| 2011/0303601 A1 | * | 12/2011 | Gastaldi ................ E02B 15/048 |
| | | | 210/242.1 |
| 2011/0318106 A1 | | 12/2011 | Gateff et al. |
| 2012/0051840 A1 | | 3/2012 | Hatton |
| 2013/0108369 A1 | | 5/2013 | Splittstoesser |
| 2013/0146546 A1 | | 6/2013 | Goulet |
| 2015/0023734 A1 | | 1/2015 | Higgins |
| 2015/0034565 A1 | * | 2/2015 | Vaz Viegas ............. E02B 15/10 |
| | | | 210/747.5 |
| 2016/0017559 A1 | * | 1/2016 | Rasmussen ......... E02B 15/0842 |
| | | | 405/63 |
| 2016/0237634 A1 | | 8/2016 | Higgins |

FOREIGN PATENT DOCUMENTS

| | | |
|---|---|---|
| WO | WO 2012/002695 | 1/2012 |
| WO | WO 2016/134036 A1 | 8/2016 |
| WO | WO 2017/030946 | 2/2017 |

OTHER PUBLICATIONS

Non-Final Office Action for U.S. Appl. No. 15/045,794, "Submersible Isolation Enclosure Apparatus", dated Sep. 22, 2016.
Notification of Transmittal of the International Search Report and the Written Opinion of the International Searching Authority, or the Declaration for International Application No. PCT/US2016/046743, "Floatable Apparatus for the Collection, Separation, Containment and Removal of Total Solids from Surface Water", dated Oct. 24, 2016.
International Search Report and Written Opinion of the International Searching Authority, dated Jul. 29, 2016 for International Application No. PCT/US2016/018297 titled "Submersible Isolation Enclosure Apparatus".
Notification Concerning Transmittal of International Preliminary Report on Patentability for International Application No. PCT/US2016/046743, Floatable Apparatus for the Collection, Separation, Containment and Removal of Total Solids From Surface Water, dated Mar. 1, 2018.
International Preliminary Report on Patentability issued in International Application No. PCT/US2016/018297, entitled: "Submersible Isolation Enclosure Apparatus": dated Aug. 22, 2017.

* cited by examiner ness of the invention.

FLOATABLE APPARATUS FOR THE COLLECTION, SEPARATION, CONTAINMENT AND REMOVAL OF SOLIDS FROM A WATER BODY

RELATED APPLICATION

This application claims the benefit of U.S. Provisional Application No. 62/205,475 filed on Aug. 14, 2015. The entire teachings of the above application are incorporated herein by reference.

BACKGROUND OF THE INVENTION

Increasing urbanization, poor land use practices, deposition of air emissions, poorly treated storm water flows, contaminated ground water discharges to surface water, point and nonpoint discharges of pollution, and increased use of some chemicals and nutrients among many different types of primarily human activities have led to the degradation of surface water quality. Once some types of pollution enter a water body, they can continue to impact surface water quality and use for many years; even after removing external sources of pollution. In the case of some nutrients such as phosphorus and nitrates, this can lead to harmful algae blooms, changes in water chemistry, recreational and potable limitations on water use and economic impacts such as reduced real estate values or revenue for industries relying on clean water.

Thus, there is a need for cost effective, scalable and portable means to remove some types of pollutants present as total solids (dissolved, colloidal and total suspended solids including nutrients, algae and cyanobacteria) in surface water bodies.

SUMMARY OF THE INVENTION

In one aspect, the invention pertains to a floatable apparatus for removal of total solids from fluid in a surface water body. The floatable apparatus comprises at least one base member enclosure of water resistant or waterproof material having an exterior, an interior, closed bottom, and an open or closed top having a perimeter, wherein the base member has an inlet for influent on one end of the base member, an outlet for effluent on or near the opposite end of the base member, and further wherein the interior of the base member is configured to remove total solids from fluid entering into the apparatus from a surface water body; a collection member of water resistant or waterproof material configured to direct fluid containing total solids into the inlet of the base member, the collection member further comprising an upper perimeter having a tubular sleeve for receiving a floatation member, a bottom perimeter and a tubular sleeve at the bottom perimeter for receiving a weight; optional floatation member of flexible water resistant or waterproof material connected or inserted into the perimeter of the at least one base member and/or the upper perimeter of the collection member; and at least one attachment point on at least one of the base member, collection member and floatation member when present.

In another aspect, the floatable apparatus for removal of total solids from fluid in a surface water body comprises at least one base member enclosure of water resistant or waterproof material having an exterior, an interior, closed bottom, and an open or closed top having a perimeter, wherein the base member has an inlet for influent on one end of the base member, an outlet for effluent on or near the opposite end of the base member, and further wherein the interior of the base member is configured to remove total solids from fluid entering into the apparatus from a surface water body; optional floatation member of water resistant or waterproof material connected to or inserted into the perimeter of the at least one base member; and at least one attachment point on at least one of the base member or floatation member when present.

In another aspect, the invention pertains to the use of the floatable apparatus described herein in a method for removing total solids from fluid of a surface water body. The method comprises deploying a floatable apparatus on the surface of a water body to remove total solids from fluid of a surface water body; allowing or inducing fluid flow or by pumping fluid and total solids from the surface water to enter a floatable apparatus; collecting the total solids in the interior of the base member of the floatable apparatus; and optionally disposing the total solids.

In a further aspect, the invention pertains to the use of the floatable apparatus described herein in a method for removing total solids, algae or cyanobacteria from a surface water body, comprising: deploying the floatable apparatus to a specific area of the water body identified as containing targeted volumes of total solids, algae or cyanobacteria, using the collection member to capture and collect the targeted volume for mixing and treatment with chemical and/or physical processes in the collection and base members of the apparatus to separate, contain and remove the total solids, algae or cyanobacteria from the surface water body.

In yet another aspect, the invention pertains to use of the floatation apparatus described herein in a method for removing sediment from the bottom of surface water body, comprising: deploying the floatable apparatus onto the specific area of the water body identified as containing sediment; disturbing and suspending sediment within the collection member; and processing the suspended sediments through the apparatus to remove total solids from fluid.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
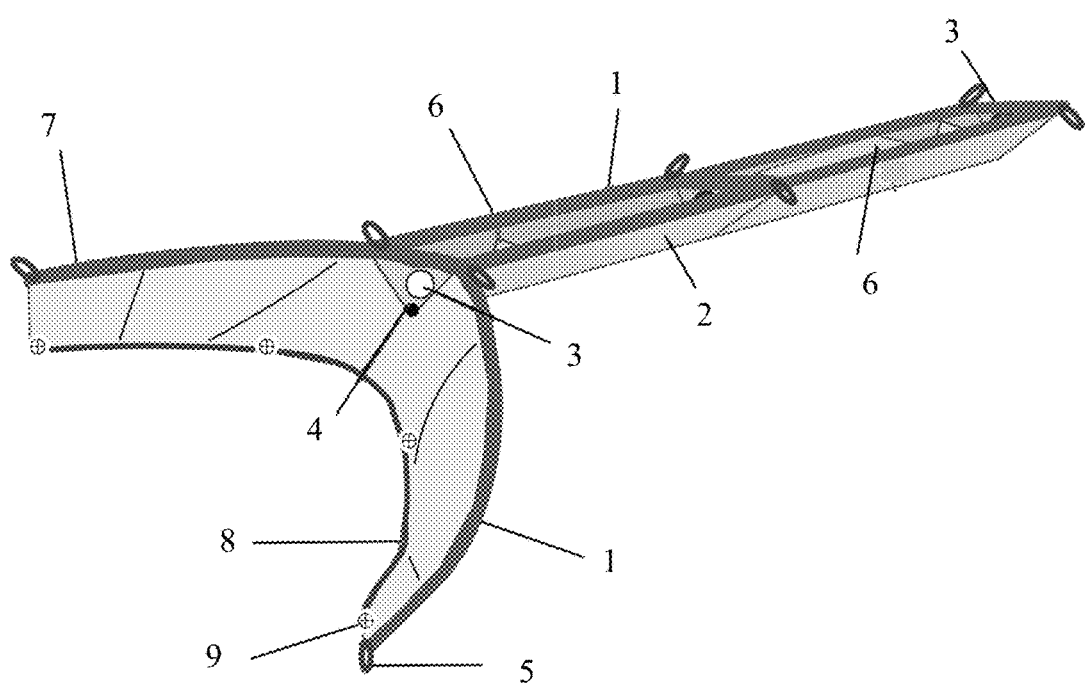
FIG. 1 is a schematic of an example floatable apparatus of the invention.
Figure 2A:
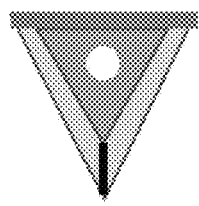
FIG. 2A shows a cross-section view, by width, of a V-shaped trough in the base member.
Figure 2B:
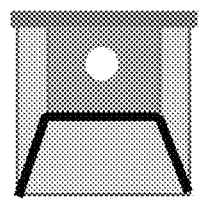
FIG. 2B shows a cross-section view, by width, of a rectangular-shaped trough in the base member.
Figure 2C:
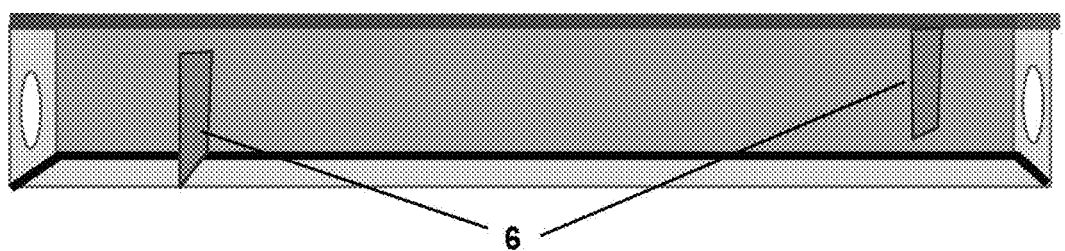
FIG. 2C shows a cross-section view, by length, of a rectangular shaped base member with wall members.
Figure 2D:
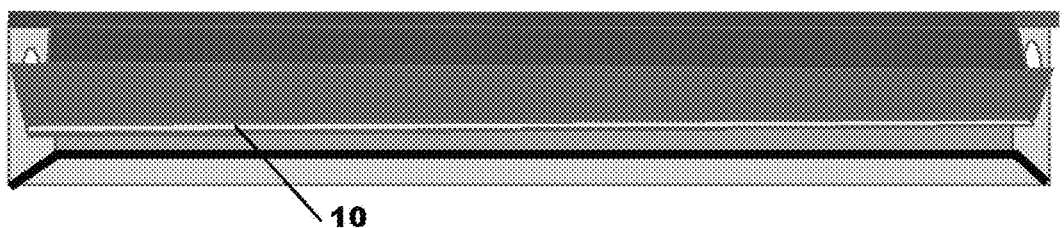
FIG. 2D shows a cross-section view, by length, of a stacked apparatus configuration with a V-shaped trough inside a rectangular base member. The opening 10 in the upper base member for total solids transfer is shown.

A description of example embodiments of the invention follows.

The floatable apparatus is comprised of the elements discussed below and with reference to the accompanying figures.

The invention pertains to a floatable apparatus for the collection, mixing, separation, containment and removal of total solids from fluid in surface water bodies, such as but not limited to sediment, detritus, algae or cyanobacteria, colloidal and dissolved nutrients and contaminants, from fluid entering or pumped into the apparatus from surface water. In one aspect, the apparatus is comprised of floatation members and one or more base members constructed of continuous film, fabric or rigid sheeting and forming troughs between floatation members, wall members to create compartments in the troughs formed by the base members and floatation members, and one or more collection members that can be used to collect and direct fluid containing total solids into the apparatus. Influent and effluent or connecting openings for joining to other base members can be situated anywhere on the apparatus in a manner which enhances operation of the apparatus. Floatation members are attached or formed along the perimeter of each base member trough area and on collection members and include attachment points for moving the apparatus around in a surface water body, for attaching multiple apparatuses together, for attaching fixed structural supports to the apparatus, or for anchoring the apparatus in place, and attachment points and sleeves for adding rigid piping or rods to help maintain the shape and function of the apparatus when in use. The base members being configured preferably as either V-shaped and/or rectangular troughs whose cross-sectional area and length are constructed to maximize mixing, settling or floatation of total solids from fluid depending upon fluid flow rates into the apparatus, flocculation or coagulation rates of total solids, and the types and concentrations of total solids. Base members can also be constructed with an upper and lower trough area, essentially as vertically-stacked base members, where the upper base member has a centrally-located, longitudinal opening to allow for pass through and containment of either settling total solids from the upper base member into the lower base member or for floatation of total solids from the lower base member into the upper base member. The wall members serve to divide the base member trough area into two or more connected compartments where the wall members are positioned vertically to horizontally across the width of the trough and can be secured to the base member layer and extend fully or partially between the top of the floatation members to the base of the base member. Wall members can be constructed of fluid pervious or impervious film, fabric or rigid solids such as boards to serve as weirs, baffles or barriers to facilitate separation and containment of total solids by mixing, settling, floatation or filtration. Each base member can be constructed of one or more, end to end or side by side, interconnected base members with fluid influent and effluent locations situated to control the fluid flow retention time to maximize mixing, settling or floatation of total solids from fluid within the apparatus. One or more sections of rigid piping with perforations at selected locations can be placed along the base of each base member to facilitate either removal of total solids and fluids or addition of treatment fluids and gases to promote mixing, settling or floatation of total solids. Fluid within and effluent from the apparatus can be further processed by recycling and filtration to recover treatment fluids and to remove additional total and dissolved solids. The apparatus or sections of the apparatus can also be covered with a removable continuous film, fabric or rigid sheeting to control conditions within the apparatus, or the effects of external environmental factors, such as may be presented by wind and wave disturbance, sunlight, diffusion of gas, or water fowl, on the functioning of the apparatus. The removable cover can facilitate removal of total solids from the fluid to aid in recovery and recycling of treatment substances or fluids.

One or more tubular floatation members constructed of water-resistant and air-resistant material that can be a continuous film, fabric or rigid sheeting, preferably fluid barrier to water proof, polyethylene, polyester or nylon based, including film or coatings of polyvinyl chloride or similar to limit air permeation through the film or fabric. The floatation member can be inflated with gas or filled with solid floatation material inserts to provide buoyancy to the floatable apparatus of the invention. Seams of the floatation members can be sewn, heat sealed, radio-frequency sealed, and/or adhesive sealed to minimize air permeation, water permeation and loss of floatation capacity. The floatation members can be present on the floatable apparatus in removable sections or they can be integrally formed along the perimeter of the base or collection members, as for example by seaming the base member material into pockets or sleeves to allow for insertion of inflatable tubes of water and air resistant material or solid floatation material. For example, sections of each floatation member can be removed or modified to facilitate connection to other base members and fluid flow into and out of the apparatus. Floatation members can be fixed to or detachable from the floatable apparatus through attachment points 5 located on the floatation members, the base member, the collection member or combination of these. FIG. 1 shows floatation members 1 on the upper perimeter of the collection member 7 and on the upper perimeter of the base members 2. The floatation members are in contact with the surface of the water when deployed in the water body. The floatation members can be deflated when the apparatus is not in use or to protect the device from environmental conditions, such as strong winds and wave turbulence from approaching storms by submerging the floatable apparatus. Depending upon the depth of the total solids in a surface water body, the floatation members can be inflated or deflated to accommodate the collection depth of the total solids.

One or more V-shaped and/or rectangular-shaped base members 2 (FIG. 1) forming troughs, extending between and connected to the floatation members. The base members are constructed of water-resistant and air-resistant material that can be a continuous film, fabric or rigid sheeting, preferably fluid barrier to water proof, polyethylene, polyester or nylon based, including film or coatings of polyvinyl chloride or similar to limit air and water permeation through the film or fabric. Base members can be interconnected side by side or end to end with other base members to increase the retention time for fluid and total solids entering or leaving the apparatus from influent opening 3 and effluent opening 3, both of which can be opened or closed depending upon operation mode. A plurality of base members can be interconnected using attachment points or they can be sewn together or integrally formed.

In one version of the invention, two base members can also be vertically stacked with lower and upper base members during operation of the apparatus to assist with the settling or floatation of total solids from fluid. FIGS. 2A-2D depict cross-section views of the base members 2 in V-shaped or rectangular configurations that are further shown in single or stacked configurations. For vertically-stacked configurations of two base members (e.g., FIG. 2D), the upper base member will have a centrally-located, longitudinal opening 10 to allow for settling total solids to pass into the lower base member or for floatable total solids to float up into the upper base member from the lower base member trough area. In this manner settling or floatable total solids can be separated and contained from portions of the base member troughs where fluid is flowing through the apparatus. Separated total solids can be removed as needed from the floatable apparatus, and base member units containing processed total solids can be detached from the floatable apparatus and transported to a land based area for direct removal of total solids from the floatable apparatus and surface water body. Alternatively, this same function can also be provided by piping connecting the floatable apparatus to a shore based area or boat to allow for pumping out and removal of total solids from the floatable apparatus and surface water body. The floatable apparatus can also be connected to natural or manmade fluid outlet(s) of a surface water body to allow for collection, separation, containment and removal of total solids from fluid entering the apparatus before discharging of this fluid into the surface water bodies' outlet(s).

As shown in FIG. 1, rigid piping or rods 4 can be attached to or placed in the base member or floatation member of the floatable apparatus to maintain shape and operation of the apparatus, particularly with wind and wave disturbance during operation. The piping or rods 4 can extend a portion or the full length of the base or floatation member or be driven into the sediment through attachment points on the apparatus. In FIG. 1, two base members are fluidly connected in series where the piping or rods 4 can extend across one or both of the base members for maintaining the shape of the apparatus and connected base members. Perforated rigid piping can be added into the trough structures created by the base members to add or remove fluid or total solids. For the rectangular configuration (FIG. 2B), one or more pipes or rods can be located along the interior edges of the base member.

Attachment points 5, as shown in FIG. 1, can be situated anywhere on the floatable apparatus to serve as anchor or attachment points to other parts of the apparatus. The attachment points can also be used to attach accessories to the apparatus, such as but not limited to weights, buoys, rigid rods, suspension cables, ropes, chains, structural supports, anchors, piping, pumps, rafts or boats. Attachment points can be loops, loop/hook (e.g., VELCRO™), grommets, stitching, ties or other means for connecting the accessories to the floatable apparatus.

The wall members 6 serve to divide the base member trough into one or more compartments to aid in mixing and separation of total solids from fluid pumped into or entering the apparatus. Wall members can be constructed of continuous film or fabric or solid material, such as the same material used for the base member or wood or rigid plastic and be either pervious or impervious to fluid. Wall members can be configured in any horizontal to vertical plane or three-dimensional shape to serve as fluid dams, weirs, baffles or barriers in a manner which assists in collection, mixing, separation, containment and removal of total solids from fluid entering or pumped into the apparatus. Particle separation media, or chemically-reactive or biologically-reactive or sorptive media or coated media such as polyester matting, sand, iron filings, liquid-phase granular carbon, iron oxide or lanthanum-coated granular carbon or aluminum-coated granular carbon or coated porous media such as plastic beads or filter fabric, or bacteria inoculated granular carbon can be placed between wall members to aid in separation, containment and removal of total solids from fluid in a base member of the floatable apparatus.

Figure 3A:
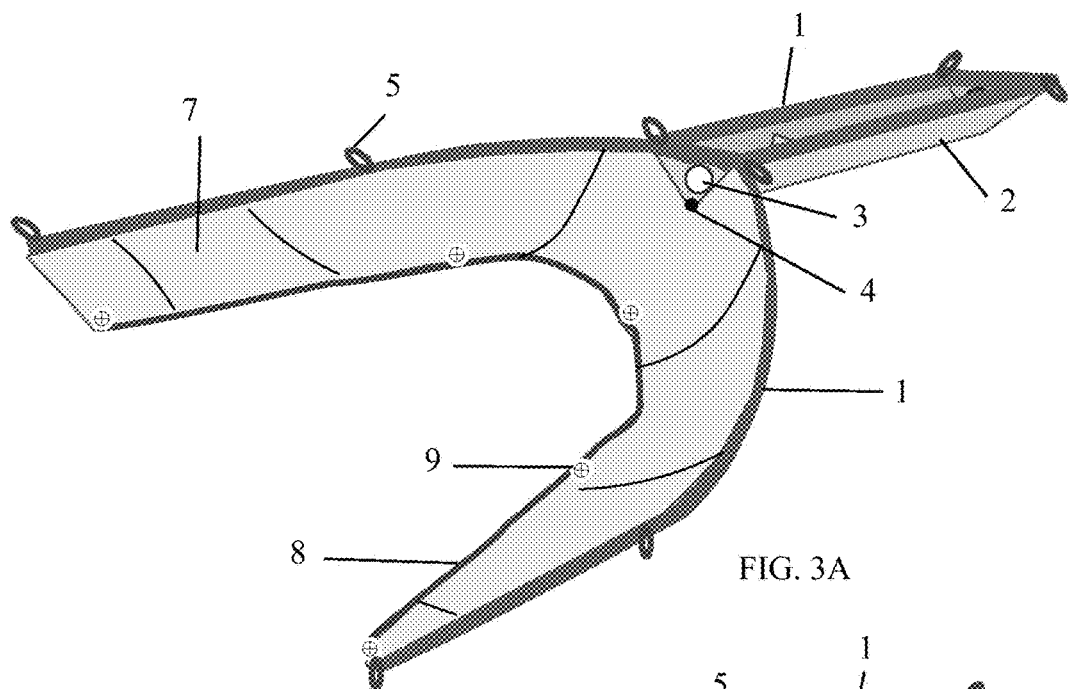
FIG. 3A is a schematic of an example floatable apparatus of the invention with an open collection member.
Figure 3B:
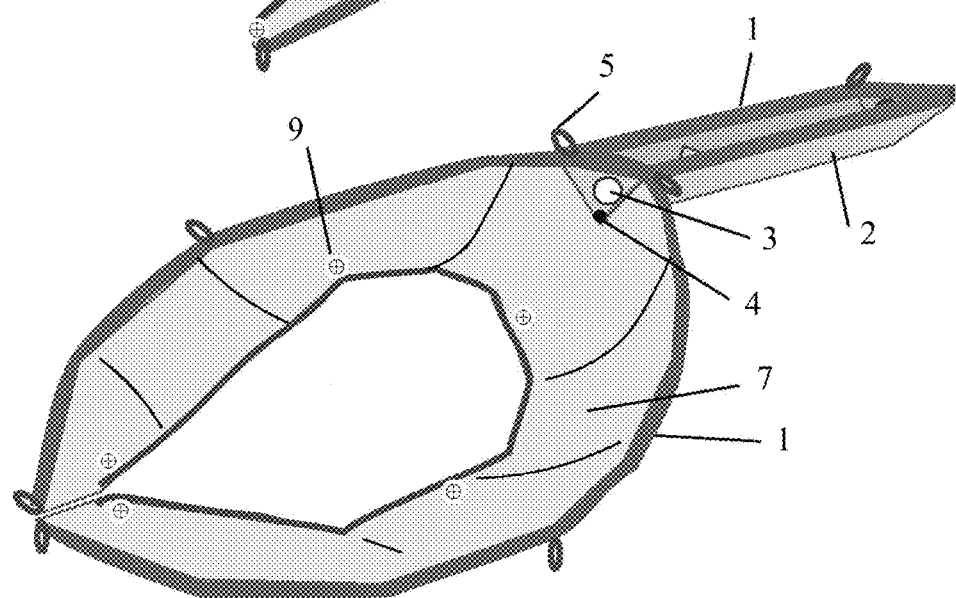
FIG. 3B is a schematic of an example floatable apparatus of the invention with a closed collection member.

The collection members 7 can be attached to the influent opening 3 of a first base member. The collection members are configured to collect, contain and isolate areas of surface water for processing of fluid containing total solids through the floatable apparatus. Collection members are constructed of continuous, water pervious or impervious, film or fabric (such as but not limited to polyester, polyethylene and nylon or polyvinyl chloride coated fabrics or rigid sheeting) with upper floatation members 1 or a sleeve for receiving floatation member 1 and lower tubular sleeves 8 or connection points 9, such as grommets or loops to hold weights. They can be of any length and width and extend fully or partially through the water column (the vertical span of water between the water surface and bottom sediment), or fixed to collect fluid and total solids from a targeted water column depth interval. The lower tubular sleeves can house weights, such as chains. The collection members can either be left open to collect, contain and direct fluid flow and total solids into the apparatus, or the outer ends can be drawn together using rope, grommets and attachment points to contain a targeted volume of fluid and total solids, or extend to the shore of a surface water body to allow for containment and processing through the apparatus of targeted areas of fluid and total solids in a surface water body. FIG. 3 depicts open and closed configurations of the collection members. When not needed, collection members can be deflated and drawn back to the base member or detached from the floatable apparatus and either removed from the surface water body or left in place for future use by the floatation apparatus. Although FIG. 1 depicts a specific configuration, additional collection members of different lengths, widths or locations within a surface water body can be used by the apparatus when needed. In this configuration, water can be induced to flow into the base members by pumping or water can naturally be allowed into the base member by wind, waves or currents. Rigid piping or rods can be added to the collection member to aid in controlling the shape and function of the apparatus or to add fluid in the collection member area to enhance separation of total solids from fluids.

Figure 4:
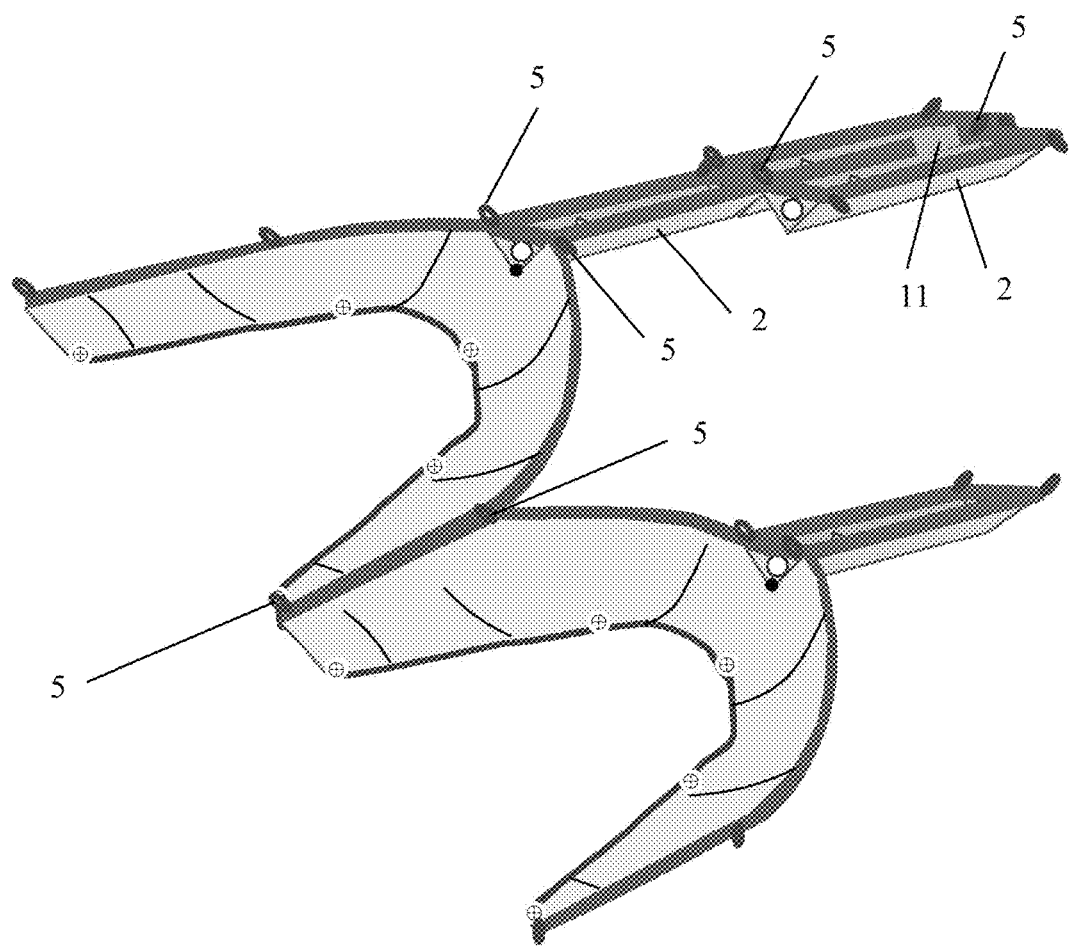
FIG. 4 is a schematic of two example flotation apparatuses of the invention connected together by way of attachment points 5. Also shown are two base members 2 connected in parallel by attachment points 5.

The apparatus can be floated, moved and deployed in selected areas of a surface water body, such as at swimming beaches, at outlets, or areas where total solids in fluid including harmful algae blooms have concentrated or are likely to be captured by the apparatus. The apparatus can also be anchored or attached to a fixed structure to maintain its location and function within a surface water body. A plurality of apparatus base member troughs can be linked together side by side or end to end to increase fluid and total solids containment volume, fluid flow retention time, and the available time for separation and containment of total solids from fluid. Linked floatable apparatuses can also be positioned such that collection members can capture and direct flow into the apparatus from different directions and areas, or to increase the overall collection volumes of fluid and total solids for processing through one or more apparatuses in a surface water body, as shown in FIG. 4. Opening 11 between base members is shown.

The primary function of the floatable apparatus of the invention is to provide an easily portable, floatable and scalable means to collect, mix, separate, contain and remove total solids, including sediments, algae and cyanobacteria, from fluid in a surface water body.

A secondary function of the floatable apparatus is to allow for the targeted alteration of physical, biological or chemical properties of fluid and total solids within the collection member or base member areas of the apparatus to assist with the separation, containment and removal of total solids from fluid in a surface water body by mixing, sorption, settling, floatation or filtering. Commercially-available or proprietary flocculants, coagulants, biological or chemical substances and mixtures and coatings, physical alterations, dissolved or dispersed gas injection, or pumping or injection of liquid, gases, and liquid-gas mixtures can be used to increase the effectiveness of total solids collection, mixing, separation, containment and removal by the floatable apparatus.

A third function of the floatable apparatus is to separate and contain settled or floated total solids in a manner which minimizes redistribution of these total solids with fluid flow continuing through the floatable apparatus until the total solids can be removed.

A fourth function of the floatable apparatus is to be readily portable, floatable and deployable so that targeted areas of total solids in a surface water body, such as a harmful algae bloom area or prior to a surface water outlet, can be captured using the collection members and then processed through the base members for separation, containment and removal of total solids.

A fifth function of the floatable apparatus is to allow for either passive or active collection, mixing, separation and containment of total solids from fluid using natural or induced water flows or pumping before removal of recovered total solids from a surface water body.

A sixth function of the floatable apparatus is to provide floatable and portable containment capacity for removal of total solids collected and separated out in the apparatus. In this manner, as the operation of the floatable apparatus collects, separates and contains total solids from fluid of a surface water body, total solids filled base member troughs can be detached or total solids pumped out or placed into separate base member troughs for further processing, such as dewatering of total solids and/or transport to access points along the water body shore for land-based reuse or disposal of these contained total solids.

A seventh function of the apparatus is to allow for recycling and reuse of commercially-available and proprietary flocculants, coagulants, biological or chemical substances and mixtures and coatings to minimize costs and further enhance the removal of total solids from fluid entering the apparatus. For example, at least a portion of the effluent can be pumped back to the inlet of the floatation apparatus to thereby recycle the chemicals or additives back into the system, after the total solids have been removed.

In accordance with the foregoing functions, in one aspect the floatable apparatus can be used in a method for removing total solids from fluid of a surface water body, comprising: deploying a floatable apparatus on the surface of a water body to remove total solids from fluid of a surface water body; allowing (e.g., by natural fluid flow, such as a current in a river) or inducing fluid flow (e.g., created by pumping, dragging or creating a current) or by pumping fluid and total solids from the surface water to enter the floatable apparatus; collecting the total solids in the interior of the base member of the floatable apparatus; and optionally disposing the total solids. Fluid flow can be induced, for example, by dragging the apparatus through a water body such as with a boat. Any of the various embodiments and features of the floatable apparatus described herein can be used to carry out the method.

In another aspect, the floatable apparatus can be used in a method for controlling total solids, algae or cyanobacteria in a surface water body, comprising: deploying the floatable apparatus to a specific area of the water body identified as containing targeted volumes of total solids, algae or cyanobacteria, using the collection members to capture and collect the targeted volume for mixing and treatment with chemical or physical processes in the collection and base members of the apparatus to separate, contain and remove the total solids, algae or cyanobacteria from the surface water body. Any of the various embodiments and features of the floatable apparatus described herein can be used to carry out the method.

In yet another aspect, the collection members of the apparatus of the invention can be used to enclose a target area comprising sediment and total solids to be removed from the target area. The sediment and total solids can be disturbed to cause the sediment and total solids to become suspended or float in the target area for further processing through the base members to remove the total solids from the fluid. Any method for disturbing the sediment such that it can be collected in the floatable apparatus of the invention is contemplated herein. In one aspect, the sediment can be physically disrupted using agitation, such as raking the sediment. In another aspect, the sediment can be disturbed by injecting liquid or liquid/gas mixtures into the sediment to cause the sediment to rise or float or otherwise be directed into the collection member of the floatable apparatus of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A floatable apparatus for removal of solids from a targeted water column or a targeted water column depth interval in a water body, comprising:
   at least one base member enclosure of water resistant or waterproof material having an exterior, an interior to contain solids selected from dissolved solids, colloidal solids, suspended solids, nutrients, algae or cyanobacteria, closed bottom, and an open or closed top having a perimeter, wherein the base member has an inlet for influent on one end of the base member, and an outlet for effluent on or near the opposite end of the base member;
   a collection member of water resistant or waterproof material configured to direct fluid containing the solids into the inlet of the at least one base member, the collection member further comprising an upper perimeter having a tubular sleeve for receiving a floatation member, a bottom perimeter and a tubular sleeve at the bottom perimeter for receiving a weight, wherein the collection member extends through a targeted water column or a targeted water column depth interval;
   floatation member of flexible water resistant or waterproof material connected or inserted into the perimeter of the at least one base member and the upper perimeter of the collection member, the floatation member being inflatable or deflatable to deploy the at least one base member to a targeted water column or a targeted water column depth interval; and at least one attachment point on at least one of the base member, collection member and floatation member.

2. The floatable apparatus of claim 1, wherein the at least one attachment point is configured for attaching the at least one base member to the collection member, attaching the at least one base member to the floatation member, or attaching at least one accessory to the floatable apparatus.

3. The floatable apparatus of claim 2, wherein the at least one accessory is selected from weights, rigid rods, buoys, suspension cables, ropes, structural supports, anchors, chains, rafts, boats, pumps or piping.

4. The floatable apparatus of claim 1, wherein the at least one attachment point is configured for attaching one or more floatable apparatuses together.

5. The floatable apparatus of claim 1, wherein the at least one base member is fluidly connected in series to at least one other base member.

6. The floatable apparatus of claim 5, wherein the at least one base member is fluidly connected in series to at least one other base member at attachment points located on the base members and/or floatation member when present.

7. The floatable apparatus of claim 1, wherein the at least one base member is fluidly connected in parallel to at least one other base member.

8. The floatable apparatus of claim 7, wherein the at least one base member is fluidly connected in parallel to at least one other base member at attachment points located on the base members and/or floatation member.

9. The floatable apparatus of claim 1, wherein the at least one base member is fluidly connected in series and parallel, to at least two other base members.

10. The floatable apparatus of claim 9, wherein the at least one base member is fluidly connected in series and parallel, to at least two other base member by attachment points located on the base members and/or floatation member.

11. The floatable apparatus of claim 1, wherein the collection member further comprises at least one connection point located distal to the floatation member on the bottom perimeter.

12. The floatable apparatus of claim 11, wherein the connection point is a grommet or a loop.

13. The floatable apparatus of claim 11, wherein the collection member is configured as a narrowing yoke or fork structure having two fork members and distal and proximal ends, a slot or opening extending between the two fork members starting from the distal end and narrowing moving towards the proximal end, terminating at a narrowed curved or arcuate concave surface at the location where the two fork members join together.

14. The floatable apparatus of claim 1, wherein the at least one base member has a cross-section width that is V-shaped with the small end of the V-shape located at the bottom of the at least one base member.

15. The floatable apparatus of claim 1, wherein the at least one base member has a cross-section width that is square or rectangular in shape.

16. The floatable apparatus of claim 1, wherein the at least one base member houses one or more pipes spanning the length of the base member, or attached to the at least one attachment point on the at least one base member.

17. The floatable apparatus of claim 16, wherein the one or more pipes are solid or perforated for adding fluid to the at least one base member or for extracting fluid or solids from the at least one base member.

18. The floatable apparatus of claim 1, wherein the floatable apparatus or portion thereof can be covered with a removable material to provide a barrier from the environment or to enhance the removal of the solids from fluid and to aid in recovery and recycling of treatment substances or fluids.

19. A method for removing solids from a targeted water column or a targeted water column depth interval in a water body, comprising:

deploying a floatable apparatus of claim 1 to a targeted water column or a targeted water column depth interval in a water body; wherein the solids are selected from dissolved solids, colloidal solids, suspended solids, nutrients, algae or cyanobacteria;

allowing or inducing fluid flow or by pumping fluid and the solids from the water column or water column depth interval to enter the floatable apparatus;

collecting the solids in the interior of the at least one base member of the floatable apparatus; and optionally disposing the solids.

20. The method of claim 19, wherein a plurality of floatable apparatuses linked together are deployed onto the target area.

21. The method of claim 19, further comprising removing at least a portion of the effluent and then recirculating the effluent back to the inlet of the floatation apparatus.

22. A method for removing solids from a targeted water column or a targeted water column depth interval in a water body, comprising:

deploying the floatable apparatus of claim 1 to a targeted water column or a targeted water column depth interval of the water body identified as containing targeted volumes of solids selected from dissolved solids, colloidal solids, suspended solids, nutrients, algae or cyanobacteria;

capturing the solids with the collection member and directing the targeted volumes of solids into the at least one base member; and mixing and treating the solids with chemical or physical processes in the at least one base member of the apparatus to remove the solids, from the water.

23. A method for removing sediment from the bottom of a water body, comprising:

deploying the floatable apparatus of claim 1 onto the specific area of the water body identified as containing sediment;

disturbing and suspending sediment within the collection member; and processing the suspended sediments through the at least one base member of the apparatus to remove the sediment from the fluid.

24. The floatable apparatus of claim 1, wherein the interior of the at least one base member comprises at least one wall member to mix and/or separate the solids from the fluid.

25. A floatable apparatus for removal of solids from a targeted water column or a targeted water column depth interval in a water body, comprising:

at least one base member enclosure of water resistant or waterproof material having an exterior, an interior, closed bottom, and an open or closed top having a perimeter, wherein the base member has an inlet for influent on one end of the base member, an outlet for effluent on or near the opposite end of the base member, and further wherein the interior of the base member comprises at least one wall member to separate and contain solids from fluid entering into the apparatus;

wherein solids are selected from dissolved solids, colloidal solids, suspended solids, nutrients, algae or cyanobacteria;

floatation member of water resistant or waterproof material connected to or inserted into the perimeter of the at least one base member, the floatation member being inflatable or deflatable to deploy the at least one base member of the floatation apparatus to a targeted water column or a targeted water column depth interval; and at least one attachment point on at least one of the base member and floatation member.

26. The floatable apparatus of claim 25, wherein the outlet for effluent is connected to a natural fluid outlet or manmade fluid outlet of a water body.

27. A method for removing solids from a targeted water column or a targeted water column depth interval in a water body, comprising:

deploying a floatable apparatus of claim 25 to a targeted water column or a targeted water column depth interval in a water body; wherein the solids are selected from dissolved solids, colloidal solids, suspended solids, nutrients, algae or cyanobacteria;

allowing or inducing fluid flow or by pumping fluid and the solids from the water column or water column depth interval to enter the floatable apparatus;

collecting the solids in the interior of the at least one base member of the floatable apparatus; and optionally disposing the solids.

28. A method for removing solids from a targeted water column or a targeted water column depth interval in a water body, comprising:

deploying the floatable apparatus of claim 25 to a targeted water column or a targeted water column depth interval of the water body identified as containing targeted volumes of solids selected from dissolved solids, colloidal solids, suspended solids, nutrients, algae or cyanobacteria;

directing the targeted volumes of solids into the at least one base member; and mixing and treating the solids with chemical or physical processes in the at least one base member of the apparatus to remove the solids from the water.

29. A method for removing sediment from the bottom of a water body, comprising:

deploying the floatable apparatus of claim 25 onto the specific area of the water body identified as containing sediment;

disturbing and suspending sediment within the collection member; and processing the suspended sediments through the at least one base member of the apparatus to remove the sediment from the fluid.

30. A floatable apparatus for removal of solids from a targeted water column or a targeted water column depth interval in a water body, comprising:

at least two base member enclosures fluidly connected in series; wherein each of the at least two base members comprises water resistant or waterproof material and has an exterior, closed bottom, and an open or closed top having a perimeter, an inlet for influent on one end of the base member, an outlet for effluent on or near the opposite end of the base member, and an interior comprising at least one wall member to separate and contain solids selected from dissolved solids, colloidal solids, suspended solids, nutrients, algae or cyanobacteria;

a collection member of water resistant or waterproof material configured to direct fluid containing solids into the inlet of at least one of the base members, the collection member further comprising an upper perimeter having a tubular sleeve for receiving a floatation member, a bottom perimeter and a tubular sleeve at the bottom perimeter for receiving a weight, wherein the collection member extends through a targeted water column or a targeted water column depth interval;

floatation member of flexible water resistant or waterproof material connected or inserted into the perimeter of the at least two base members and the upper perimeter of the collection member, the floatation member being inflatable or deflatable to deploy at least one of the base members to a targeted water column or a targeted water column depth interval; and at least one attachment point on at least one of the base members, collection member and floatation member.

* * * * *

UNITED STATES PATENT AND TRADEMARK OFFICE
CERTIFICATE OF CORRECTION

PATENT NO. : 10,253,470 B2
APPLICATION NO. : 15/235546
DATED : April 9, 2019
INVENTOR(S) : Jonathan B. Higgins Page 1 of 1

It is certified that error appears in the above-identified patent and that said Letters Patent is hereby corrected as shown below:

In the Claims

In Column 9, Claim 6, Line 24, delete "when present".

Signed and Sealed this
Eighteenth Day of June, 2019

Andrei Iancu
*Director of the United States Patent and Trademark Office*